(12) United States Patent
Nakajima

(10) Patent No.: US 7,973,951 B2
(45) Date of Patent: Jul. 5, 2011

(54) IMAGE-FORMING APPARATUS, METHOD OF CONTROLLING THE SAME, AND STORAGE MEDIUM

(75) Inventor: Satoru Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 12/168,872

(22) Filed: Jul. 7, 2008

(65) Prior Publication Data
US 2009/0027710 A1    Jan. 29, 2009

(30) Foreign Application Priority Data

Jul. 26, 2007  (JP) ................................. 2007-194792

(51) Int. Cl.
*G06F 3/12* (2006.01)
(52) U.S. Cl. ...................... 358/1.13; 358/1.12; 358/1.14; 358/1.16; 707/781; 715/277; 715/200; 715/244
(58) Field of Classification Search ........ 358/1.12–1.14, 358/1.16; 707/781–784; 715/200, 244, 277
See application file for complete search history.

(56) References Cited

U.S. PATENT DOCUMENTS

| | | | |
|---|---|---|---|
| 5,892,954 | A | 4/1999 | Tomas et al. |
| 6,429,947 | B1 | 8/2002 | Laverty et al. |
| 7,092,983 | B1 | 8/2006 | Tyrrell, III |
| 7,231,050 | B1 | 6/2007 | Harris |
| 7,580,943 | B2 | 8/2009 | Sakura et al. |
| 7,631,258 | B2 * | 12/2009 | Kayama .......................... 715/277 |
| 2004/0057073 | A1 * | 3/2004 | Egawa et al. ................. 358/1.15 |
| 2005/0154747 | A1 * | 7/2005 | Kii et al. ........................ 707/101 |
| 2005/0246631 | A1 | 11/2005 | Mori et al. |
| 2006/0033952 | A1 | 2/2006 | Oba |
| 2006/0176498 | A1 * | 8/2006 | Wada et al. ................... 358/1.13 |
| 2007/0005561 | A1 * | 1/2007 | Sakura et al. ..................... 707/1 |
| 2007/0143354 | A1 | 6/2007 | Morooka |
| 2008/0033952 | A1 * | 2/2008 | McKenney et al. ............... 707/8 |
| 2008/0049249 | A1 * | 2/2008 | Tomita ......................... 358/1.15 |

FOREIGN PATENT DOCUMENTS

| | | |
|---|---|---|
| EP | 0 278 312 | 8/1998 |
| JP | 2006-053795 | 2/2006 |
| JP | 2007-011576 A | 1/2007 |

(Continued)

OTHER PUBLICATIONS

Korean Office Action dated Dec. 23, 2009 in Korean Patent Application No. 10-2008-0072931.

(Continued)

*Primary Examiner* — Chan S Park
(74) *Attorney, Agent, or Firm* — Fitzpatrick, Cella, Harper & Scinto

(57) ABSTRACT

An image-forming apparatus includes a reception unit adapted to receive setting information that defines designation of a storage area and a process to be executed, a setting unit adapted to set the process to be executed for the designated storage area based on analysis of the setting information, an access right setting unit adapted to set an access right to access the second data, a managing unit adapted to manage the designated storage area and the second data with the set access right in association with each other, and an execution unit adapted to execute the process set in the storage area for the submitted first data and the second data that is associated with the storage area and has the set access right.

17 Claims, 14 Drawing Sheets

FOREIGN PATENT DOCUMENTS

| | | |
|---|---|---|
| KR | 10-2004-0040909 A | 5/2004 |
| KR | 10-2006-0045789 A | 5/2006 |
| WO | 2004006046 | 12/2008 |

OTHER PUBLICATIONS

Search Report, dated Oct. 22, 2008, in EP 08 16 1114.

Sloman, M., "Policy Driven Management for Distributed Systems", J. Network & Systems Mgmt., Plenum Publ. Co., U.S., vol. 2, No. 4, pp. 333-360, Jan. 1, 1994.

* cited by examiner

IMAGE-FORMING APPARATUS, METHOD OF CONTROLLING THE SAME, AND STORAGE MEDIUM

BACKGROUND OF THE INVENTION

1. Field of the Invention

The present invention relates to an image-forming technique.

2. Description of the Related Art

In recent years, multi-functional peripherals (digital multi-functional peripherals) having a number of functions added to a basic digital copying apparatus have been put into practical use. For example, it is possible to perform facsimile communication using a scanner or a printer as a standard component provided on a digital copying apparatus. It is also possible to rasterize code data sent from a computer into bitmap data and print it using the printer. One of the multiple functions is a box function. The box function stores print images and scanned images in storage areas which are prepared in the storage device of a digital multi-functional peripheral in correspondence with respective users or sections and outputs the images in accordance with user's selection of data to be output, print settings, and post-process (finishing) settings.

The above-described prior art is disclosed in, for example, Japanese Patent Laid-Open No. 2006-53795.

However, to print a document stored in a box, the conventional digital multi-functional peripheral requires the user to do a cumbersome operation of selecting a document to be printed, inputting various print settings and finishing settings, and then inputting a print instruction. In, for example, the life insurance industry, there is a case of use in which an insurance agent who has created a specification always attaches an explanation of important information to it and then gives it to the customer. At this time, the specification creator must select both the specification stored in a box and the explanation of important information by himself/herself consciously and input an output instruction. If the explanation of important information stored in the box in advance is rewritten or deleted, no intended output result can be obtained.

SUMMARY OF THE INVENTION

The present invention has been made in consideration of the above-described problems, and has as its object to enable image formation while preventing any operation error of a hot folder.

According to one aspect of the present invention, there is provided an image-forming apparatus configured to execute a process, set in connection with a storage area, on first data, in a case that the first data is submitted to a storage area, comprising: a reception unit adapted to receive setting information that designates the storage area and the process to be executed; a setting unit adapted to set the process to be executed for the designated storage area on the basis of analysis of the setting information; an access right setting unit adapted to, in a case that second data stored in another storage area is designated as data to be used for executing the process on the basis of analysis of the setting information, set an access right to access the second data; a managing unit adapted to manage the designated storage area and the second data with the set access right in association with each other; and an execution unit adapted to, in a case that the first data is submitted to the designated storage area, execute the process set in the storage area for the submitted first data and the second data that is associated with the storage area and has the set access right.

According to another aspect of the present invention, there is provided a method of controlling an image-forming apparatus to execute a process, set in connection with a storage area, on first data, in a case that the first data is submitted to the storage area, the method comprising: receiving setting information that designates a storage area and a process to be executed; setting the process to be executed for the designated storage area on the basis of analysis of the setting information; in a case that second data stored in another storage area is designated as data to be used for executing the process on the basis of analysis of the setting information, setting an access right to access the second data; managing the designated storage area and the second data with the set access right in association with each other; and in a case that the first data is submitted to the designated storage area, executing the process set in the storage area for the submitted first data and the second data that is associated with the storage area and has the set access right.

According to the present invention, image formation can be done while preventing any operation error of a hot folder.

Further features of the present invention will become apparent from the following description of exemplary embodiments (with reference to the attached drawings).

DESCRIPTION OF THE EMBODIMENTS

Preferred embodiments of the present invention will now be described in detail with reference to the accompanying drawings. Note that the constituent elements described in the embodiments are merely examples. The technical scope of the present invention is determined by the scope of claims and is not limited by the following individual embodiments.

First Embodiment (Example of Arrangement of Image-Forming System)

Figure 1:
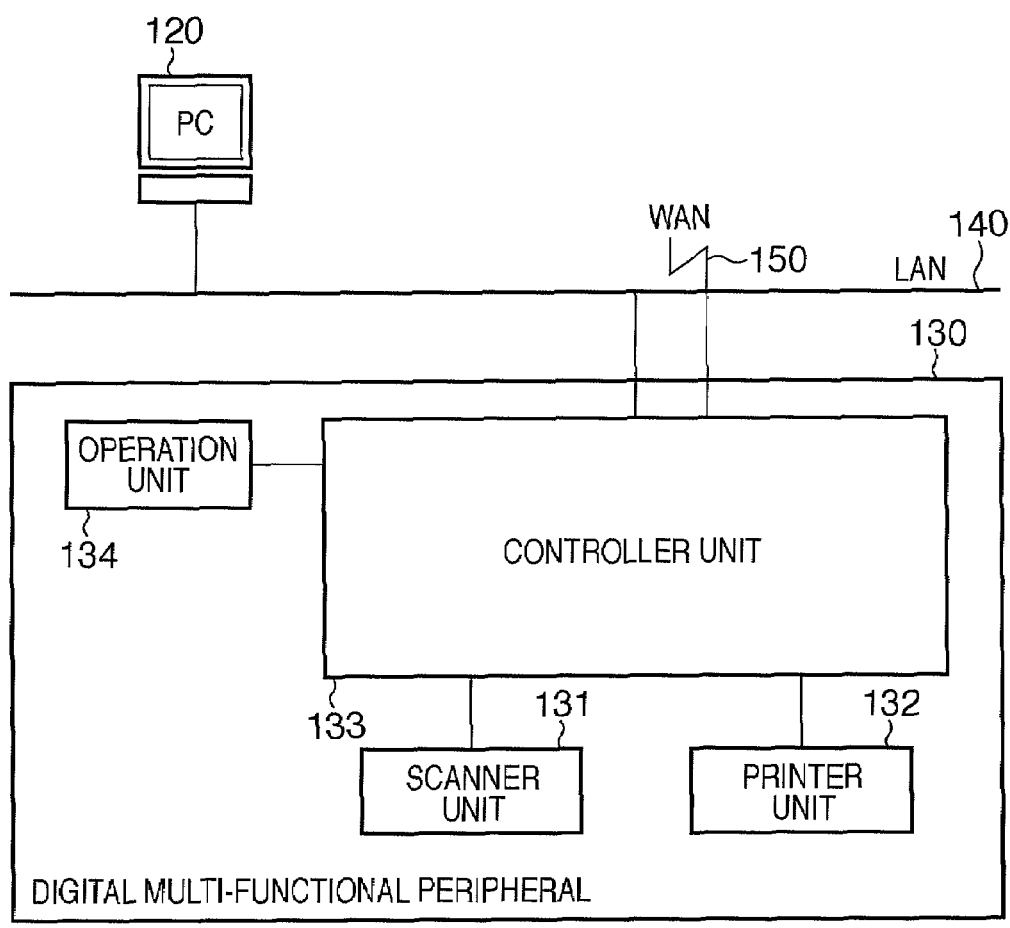
FIG. 1 is a block diagram showing an example of the arrangement of an image-forming system including an image-forming apparatus according to an embodiment of the present invention.

FIG. 1 is a block diagram showing an example of the arrangement of an image-forming system including an image-forming apparatus according to the embodiment of the present invention. The image-forming apparatus includes an information-processing apparatus (client computer) 120 and an image-forming apparatus (digital multi-functional peripheral) 130. It is possible to connect a plurality of client computers 120 and a plurality of digital multi-functional peripherals 130 via a network 140. The client computer 120 can communicate with the digital multi-functional peripheral 130 via the network 140 such as a LAN to set and mange it or submit various jobs.

(Example of Arrangement of Digital Multi-Functional Peripheral 130)

Figure 2:
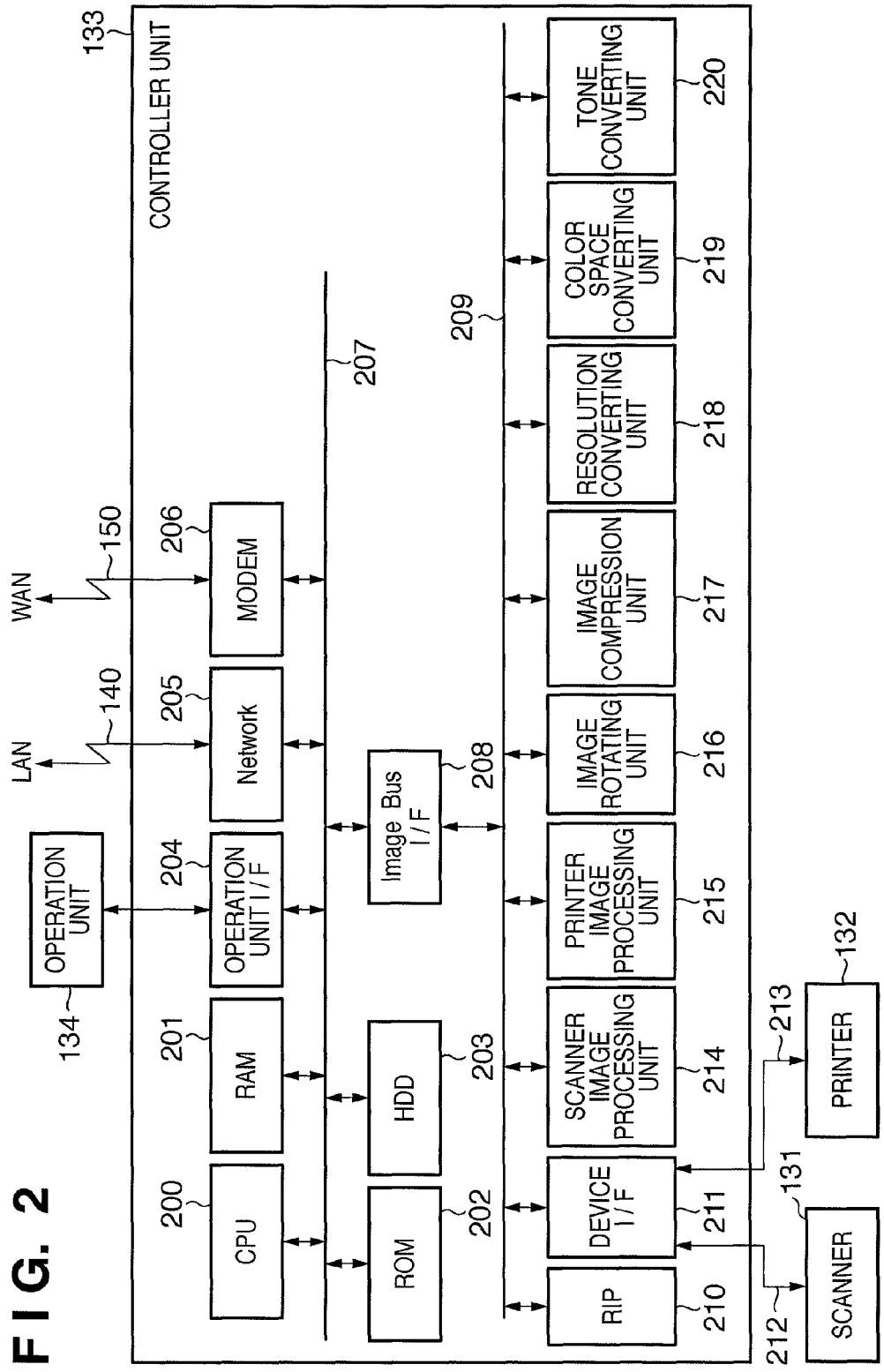
FIG. 2 is a block diagram for explaining the overall arrangement of a digital multi-functional peripheral 130 shown in FIG. 1.

FIG. 2 is a block diagram for explaining the overall arrangement of the digital multi-functional peripheral 130 shown in FIG. 1. A controller unit 133 is connected to a scanner unit 131 serving as an image-input device and a printer unit 132 serving as an image-output device. The controller unit 133 is also connected to the network (LAN) 140 and a public line (WAN) 150 to input or output image information or device information.

A CPU 200 in the controller unit 133 is a controller which controls the entire system. A RAM 201 is a system work memory for the operation of the CPU 200 and also serves as an image memory (buffer memory) to temporarily store input image data. A ROM 202 is a boot ROM which stores the boot program of the system. A hard disk drive (HDD) 203 stores system software and image data.

An operation unit I/F 204 is an interface unit to an operation unit 134. The operation unit I/F 204 outputs, to the operation unit 134, image data to be displayed on the operation unit 134 and the information of the image data. The operation unit I/F 204 also transmits, to the CPU 200, information input by the operator via the operation unit 134.

A network unit (Network) 205 is connected to the network (LAN) 140 to input or output information. A MODEM 206 is connected to the public line (WAN) 150 to input or output image information. The above-described devices are arranged on a system bus 207.

An Image Bus I/F 208 is a bus bridge which connects the system bus 207 to an image bus 209 for transferring image data at a high speed to convert a data structure. The image bus 209 is formed from a PCI bus or IEEE1394. The following devices are arranged on the image bus 209.

A raster image processor (RIP) 210 rasterizes a PDL code into a bitmap image. A device I/F 211 connects the scanner unit 131 and the printer unit 132, which serves as the image input and output devices, to the controller unit 133 via an image input unit interface 212 and a print unit interface 213, respectively. The device I/F 211 executes conversion between a synchronous system and an asynchronous system of image data. A scanner-image-processing unit 214 corrects, processes, and edits input image data. The scanner image-processing unit 214 also has a function of determining the type of an input image, color document or monochrome document, in accordance with image chroma signals and holding the determination result. A printer image-processing unit 215 corrects, processes, and edits output image data.

An image-rotating unit 216 can rotate an image and store it in the memory in cooperation with the scanner image-processing unit 214 simultaneously with image read by the scanner unit 131. The image-rotating unit 216 can also rotate an image in the memory and store it in the memory, or print an image in the memory while rotating it in cooperation with the printer image-processing unit 215.

An image-compression unit 217 executes JPEG compression/decompression for multi-valued image data and JBIG/MMR/MR/MH compression/decompression for binary image data. A resolution-converting unit 218 performs a resolution-conversion process of an image in the memory and stores it in the memory. A color-space-converting unit 219 converts, for example, a YUV image in the memory into a Lab image by a matrix operation and stores it in the memory. A tone-converting unit 220 converts, for example, an 8-bit 256-tone image in the memory into a 1-bit 2-tone image by error diffusion processing and stores it in the memory. The image-rotating unit 216, image-compression unit 217, resolution-converting unit 218, color-space-converting unit 219, and tone-converting unit 220 can operate in an cooperative manner. For example, rotation and resolution conversion of an image in the memory can be done without intervening the memory.

(Functional Arrangement of System Software)

Figure 3:
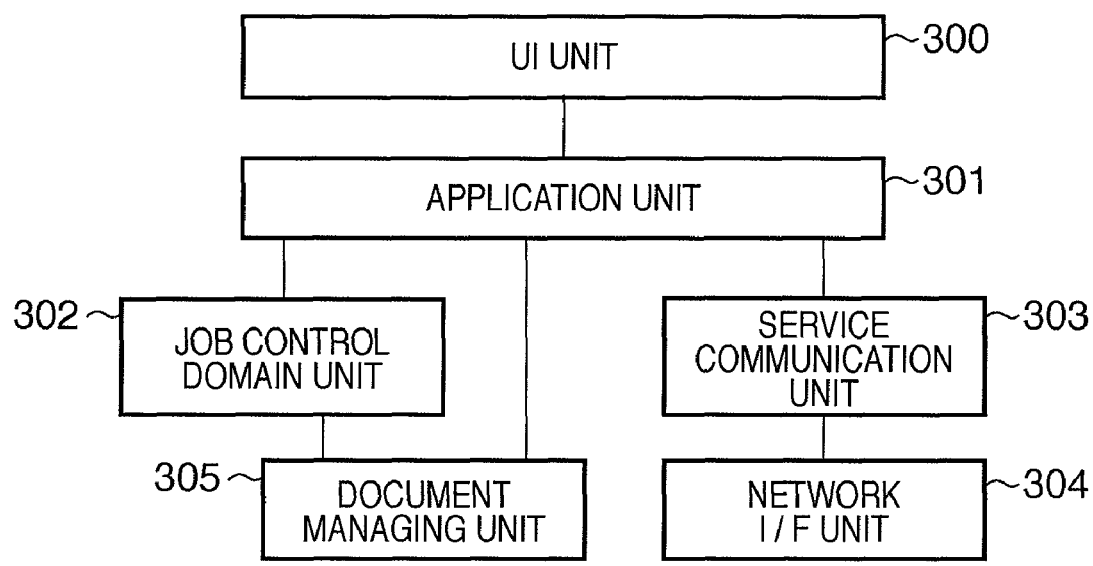
FIG. 3 is a block diagram showing the functional arrangement of system software in a controller unit 133 of the digital multi-functional peripheral shown in FIG. 1.

FIG. 3 is a block diagram showing the functional arrangement of system software in the controller unit 133 of the digital multi-functional peripheral shown in FIG. 1. A user interface (UI) unit 300 supplies input information from the operator to an application unit 301, receives the process result from the application unit 301, and generates a window to be displayed on the operation unit 134. The application unit 301 executes a process in response to a request from the user interface (UI) unit 300.

Upon receiving a scan or print request, the application unit 301 submits a job to a job control domain unit 302 together with designated settings. The application unit 301 can also receive the information of a device state or job state from the job control domain unit 302.

Upon receiving a request to refer to or edit a stored document, the application unit 301 outputs an acquisition instruction or a change instruction to a document-managing unit 305 and receives a document list or information such as a document attribute from the document-managing unit 305. The application unit 301 also receives, from a service communication unit 303 via a network I/F unit 304, a request to designate settings of the digital multi-functional peripheral from the client computer 120.

The job control domain unit 302 controls processing of a plurality of jobs such as a scan job, copy job, print job, and FAX job. The document-managing unit 305 manages image data as a document. The service communication unit 303 transmits a request command to another digital multi-functional peripheral via the network I/F unit 304 using a protocol such as WebDAV or FTP capable of transferring a file on the network and receives a response. The network I/F unit 304 is connected to the network 140 and processes a network protocol such as TCP/IP.

The HDD 203 in FIG. 2 stores system software and image data. However, the present invention is not limited to this. The HDD 203 can also store general data files such as data for image management, in addition to the images. This function is called a box of an image-forming apparatus. It is possible to create a folder in the HDD and store an image data file or general data file in it. A folder includes an area that allows only internal access in the system having the image-forming apparatus and an area accessible by the user. The user can store, for example, image data in each folder in the area accessible by the user so that the stored image can be referred, edited, deleted, or output.

(Example of Folders)

Figure 4:
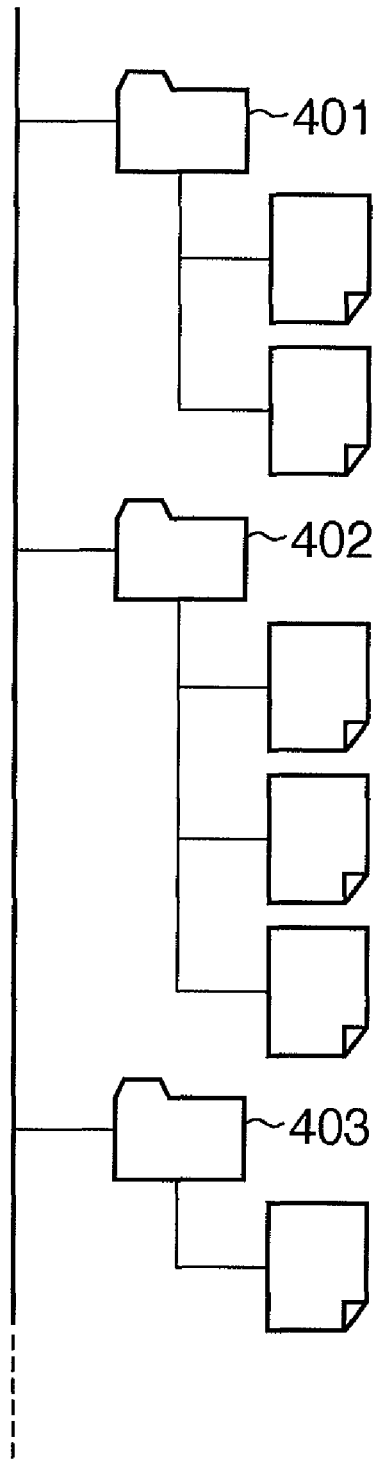
FIG. 4 is a view showing an example of folders in an area accessible by a user.

FIG. 4 is a view showing an example of folders in the area accessible by the user. FIG. 4 illustrates three folders 401, 402, and 403 which store two data, three data, and one data, respectively. Note that the number of folders is not limited to three, as a matter of course, and each folder may have a hierarchical structure. As a method of storing data in a folder, for example, image data obtained by causing the scanner unit 131 to read an image can be stored. It is also possible to generate image data from an application using a printer driver in the client computer connected to the image-forming apparatus and store the generated data in a folder.

An image or other data may be stored by directly accessing from the client computer to a folder using a protocol such as FTP, SMB, or WebDAV. The user can browse the folders and stored image data on the operation unit 134. Image data is handled as a document in accordance with the management of the system software. When a plurality of folders or documents exist, the operation unit 134 displays a folder list or a document list. By selecting a desired document from the document list, the user can execute an operation for the designated document or a process such as preview display, page insertion, move/copy to another folder, document deletion, or printing.

A hot folder will be described. In this embodiment, a hot folder indicates a storage area where a preset operation is executed for a folder in the image-forming apparatus in accordance with a set event. When data (first data) is submitted to the storage area, the image-forming apparatus can process the first data by applying a process set in the storage area.

A combination of an event and an operation to be executed in accordance it is called a hot-folder setting. The functions of the image-forming apparatus can be set as operations. Examples of the functions are "document printing", "FAX transmission", "document transmission to external device by SMB or e-mail", and "document editing". Examples of documents editing are "document copy", "document move", "document deletion", and "merging with another document". Other examples of documents editing are "document deletion from concatenated document", "page deletion", "text generation by OCR (Optical Character Recognition)", and "document format (image format) conversion". Examples of the event to be set in a folder are "document has been submitted (stored in folder)" and "predetermined time has elapsed after document submission". Other examples of the event to be set in a folder are "set time has come", "user has logged in to image-forming apparatus", "document status has been changed", and "document was printed". The above-described operations and events are merely examples, and the present invention is not limited to those. For example, any other operation or event can be set if a preset operation is executed for a folder in the image-forming apparatus in accordance with a set event, as a matter of course.

An example of a hot-folder setting method will be described next with reference to FIG. 1. The client computer 120 connected to the LAN 140 creates a hot-folder setting. A hot folder can be created by making the user describe it in accordance with a format defined in advance or by using a hot-folder setting generating application. The client computer 120 accesses, via the LAN 140, the digital multi-functional peripheral 130 and notifies it that a hot-folder setting is to be transmitted. The client computer 120 transfers the created hot-folder setting to a folder (a box of the image-forming apparatus) serving as a hot folder. The transfer can be done using a protocol such as WebDAV or FTP capable of transferring a file on the network.

(Hot-Folder Setting)

Figure 5:
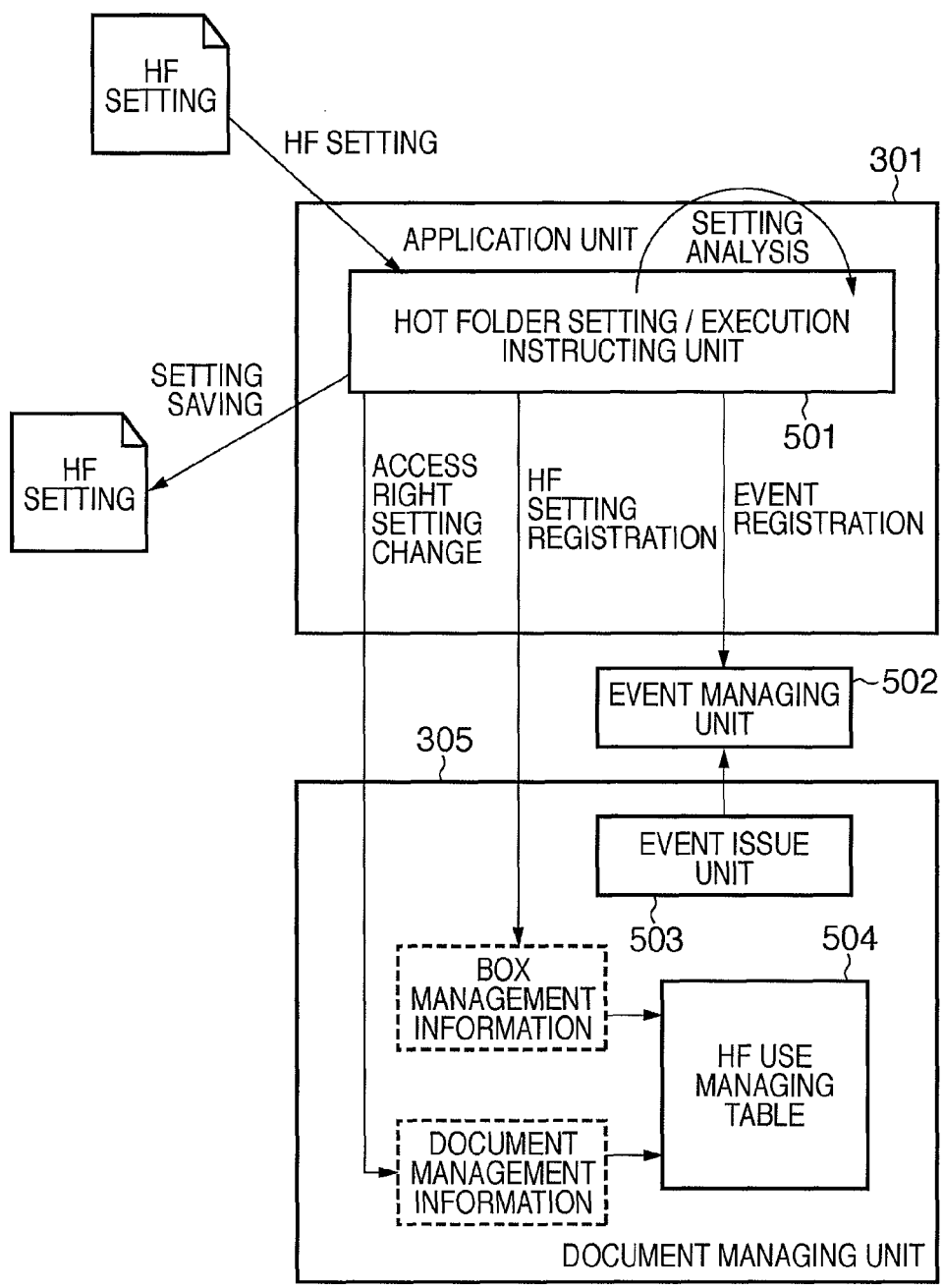
FIG. 5 is a conceptual view of hot-folder setting control executed by the system software of the digital multi-functional peripheral 130 according to the embodiment of the present invention.

FIG. 5 is a conceptual view of hot-folder setting control executed by the system software of the digital multi-functional peripheral 130. A hot folder (to be also referred to as "HF" hereinafter) setting/execution instructing unit 501 in the application unit 301 receives and saves a hot-folder setting, registers and receives an event, and executes an operation. If a hot-folder setting indicates that, for example, a document stored in the hot folder should be merged with another document stored in another folder and printed, the hot-folder setting/execution instructing unit 501 inhibits any other user from changing or deleting the designated document. That is, the hot-folder setting/execution instructing unit 501 changes the access right setting for the designated document.

An event-managing unit 502 manages event registration and request from each application and also returns an event in response to a request from each application.

An event issue unit 503 in the document-managing unit 305 transmits, to the event-managing unit 502, an event related to document management such as "document has been submitted" or "document status has been changed".

A hot-folder use table 504 manages a document which is set in a hot-folder setting as a use target for an operation in association with the hot-folder setting.

Figure 6:
FIG. 6 is a view showing an example of the definition of a hot-folder use table 504 according to the embodiment of the present invention.

FIG. 6 is a view showing an example of the definition of the hot-folder use table 504. The hot-folder use table 504 includes a hot-folder setting file ID for setting a hot folder. The hot-folder use table 504 also includes a use document ID to identify a document (document data) to be used in a hot folder, and a copy document ID to identify a copy of the document used in the hot folder. The copy document ID is identification information for specifying the copy data of a document of use generated in step S1204 in FIG. 12 to be described later.

(Hot-Folder Setting Process)

Figure 7:
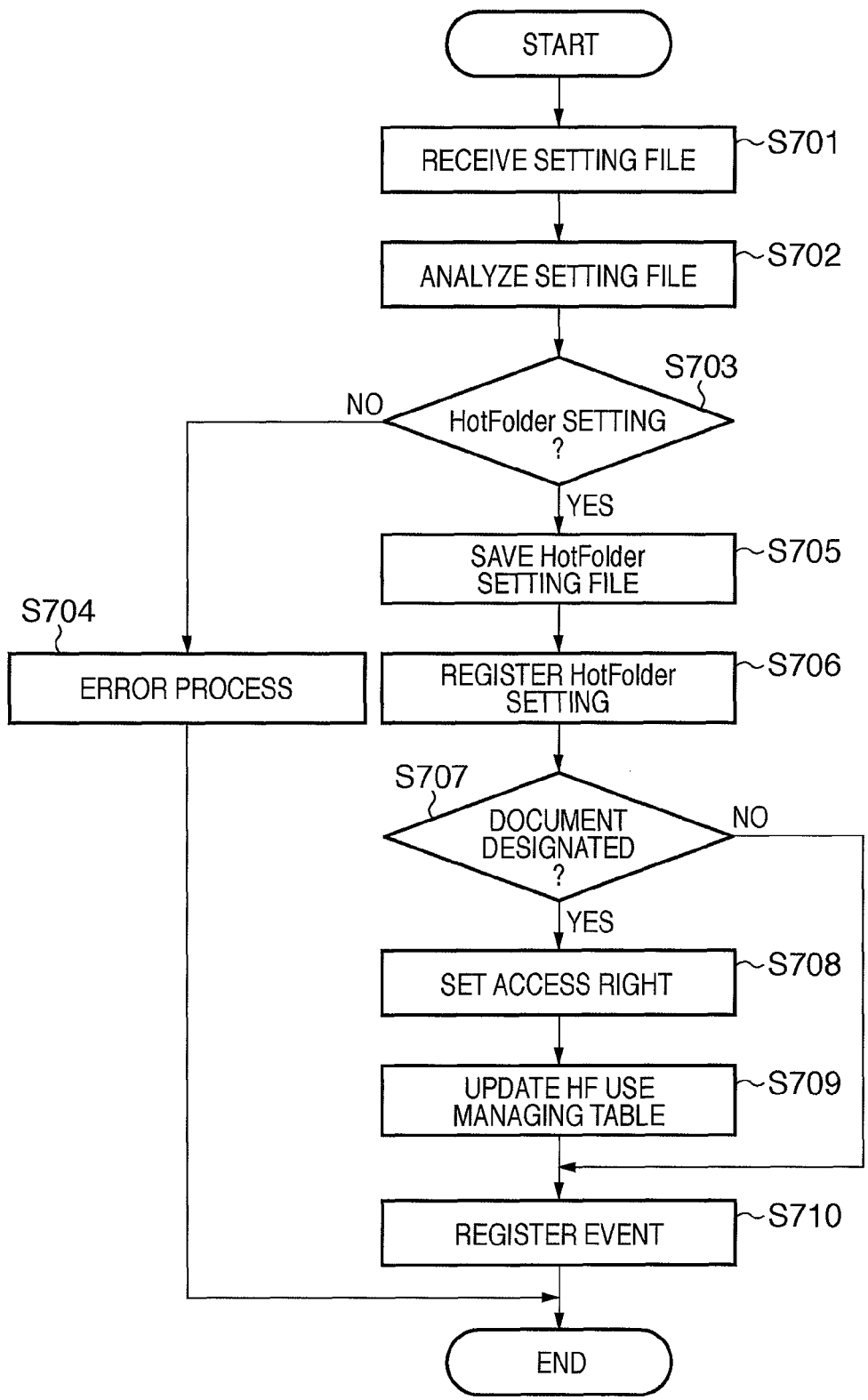
FIG. 7 is a flowchart for explaining a hot-folder setting process according to the embodiment of the present invention.

FIG. 7 is a flowchart for explaining a hot-folder setting process.

In step S701, the hot-folder-setting/execution instructing unit 501 receives a hot-folder-setting request and then receives a setting file transferred via the LAN 140. At this time, the hot-folder-setting/execution instructing unit 501 can function as a reception unit which receives setting information defining a process for a hot folder (storage area).

In step S702, the hot-folder setting/execution instructing unit 501 analyzes the setting file and determines whether it is a hot-folder setting file (S703). If it is not a hot-folder setting, an error process is executed (S704), and the process is ended.

If the file is a hot-folder setting (YES in S703), the hot-folder setting/execution instructing unit 501 saves the hot-folder setting file (S705). At this time, the received hot-folder setting file is converted into an invisible hidden file. That is, the hot-folder setting file is saved in the hot folder as a hidden file. This prevents any access to the hot-folder setting except when controlling it.

In step S706, the hot-folder setting/execution instructing unit 501 changes folder type information managed by box management information in the document managing unit 305 from "normal folder" to "hot folder". The hot-folder setting/execution instructing unit 501 functions as a setting unit which sets, based on an analysis of setting information, a designated folder (storage area) as a hot folder capable of processing data designated by the setting information.

In step S707, the hot-folder setting/execution instructing unit 501 determines whether the hot-folder setting contains a setting to use a document (second data) stored in another folder. Without use of a document (second data) stored in another folder (NO in S707), the process advances to step S710.

On the other hand, if a document (second data) stored in another folder is to be used (YES in S707), the hot-folder setting/execution instructing unit 501 sets an access right for the second data (designated document) to be used (S708). The hot-folder setting/execution instructing unit 501 functions as an access right setting unit which sets an access right to allow a hot folder to access a document (second data) when use of a document (second data) stored in another storage area is designated.

An access right setting limits access related to a hot-folder setting by, for example, "inhibiting any person except system administrator from executing deletion". The above-described access right setting is merely an example. Any other access right setting can be done if a process can be executed in accordance with a hot-folder setting without changing a document designated by it, as a matter of course.

In step S709, the hot-folder setting/execution instructing unit 501 stores, in the hot-folder use table 504, the ID of the hot-folder setting file and the ID of the use document (designated document) to be used in the hot folder in association with each other. This associates the hot folder with the use document. At this time, the hot-folder setting/execution instructing unit 501 functions as a managing unit which manages, in the hot-folder use table 504, a hot folder (storage area) designated by setting information and a document (second data) stored in another storage area in association with each other.

In step S710, the hot-folder setting/execution instructing unit 501 registers an event issue request in the event managing unit 502 to receive an event which should trigger execution of an operation, and finishes the process.

When first data is submitted to a hot folder, the CPU 200 functions as an execution unit which executes a process in a hot folder for the submitted first data and second data associated with a storage area and having an access right setting.

In this embodiment, the client computer 120 generates a hot-folder setting. However, a hot-folder setting may be generated on the operation unit 134 of the digital multi-functional peripheral 130, as a matter of course.

An operation for a document whose access right has been changed will be described next.

(Document Access Right Check Process)

Figure 15:
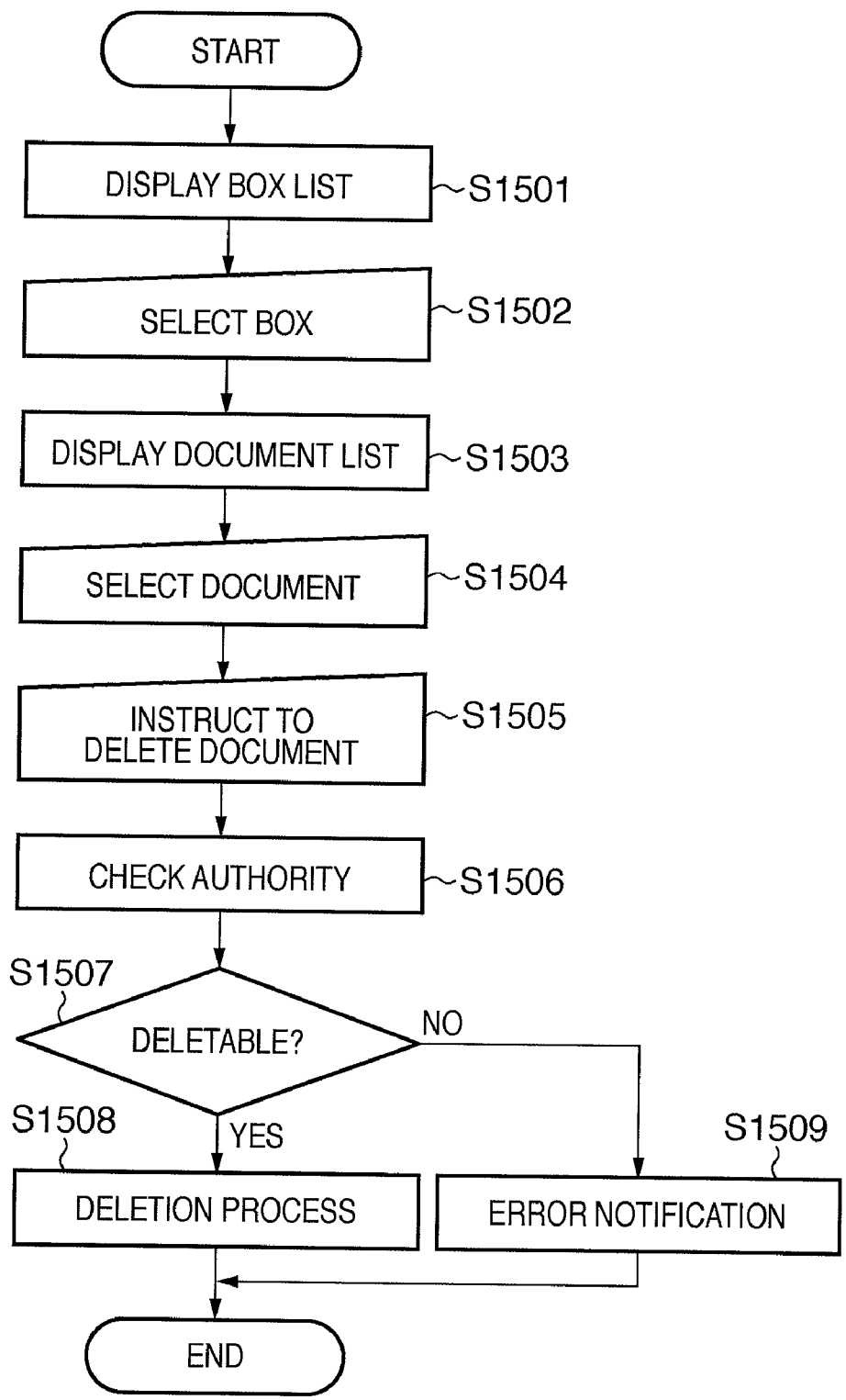
FIG. 15 is a flowchart for explaining a process of deleting a document for which a document access right is set.

FIG. 15 is a flowchart for explaining a process of deleting a document for which a document access right is set. To operate a document, the operator designates box list display to display a box list on the operation unit 134 in step S1501.

In step S1502, the operator selects an arbitrary box to display, on the operation unit 134, the list of documents in the selected box (S1503).

In step S1504, the operator selects a desired document from the document list and inputs a deletion instruction for the document (S1505). At this time, the document managing unit 305 determines, based on the information of the operator who is currently operating and access right information set for the designated document, whether the operator can delete the designated document (S1506). If deletion is possible, a deletion process is executed (S1508). If deletion is not possible, an error notification representing that deletion is inhibited is presented to the operator (S1509), and the process is ended.

The above-described document operation and determination method are merely examples. Any other document operation such as "inhibiting editing" or "permitting printing only when merged with another document" and a determination process corresponding to the operation may be performed, as a matter of course.

(Cancel of Hot-Folder Setting)

An example of a hot-folder setting canceling method will be described next. Hot-folder setting cancel is instructed and executed by the client computer 120 connected to the LAN 140. To cancel a hot folder, for example, an instruction to cancel the setting of a folder designated by a hot-folder setting application is transmitted to the digital multi-functional peripheral 130 via the LAN 140.

Figure 8:
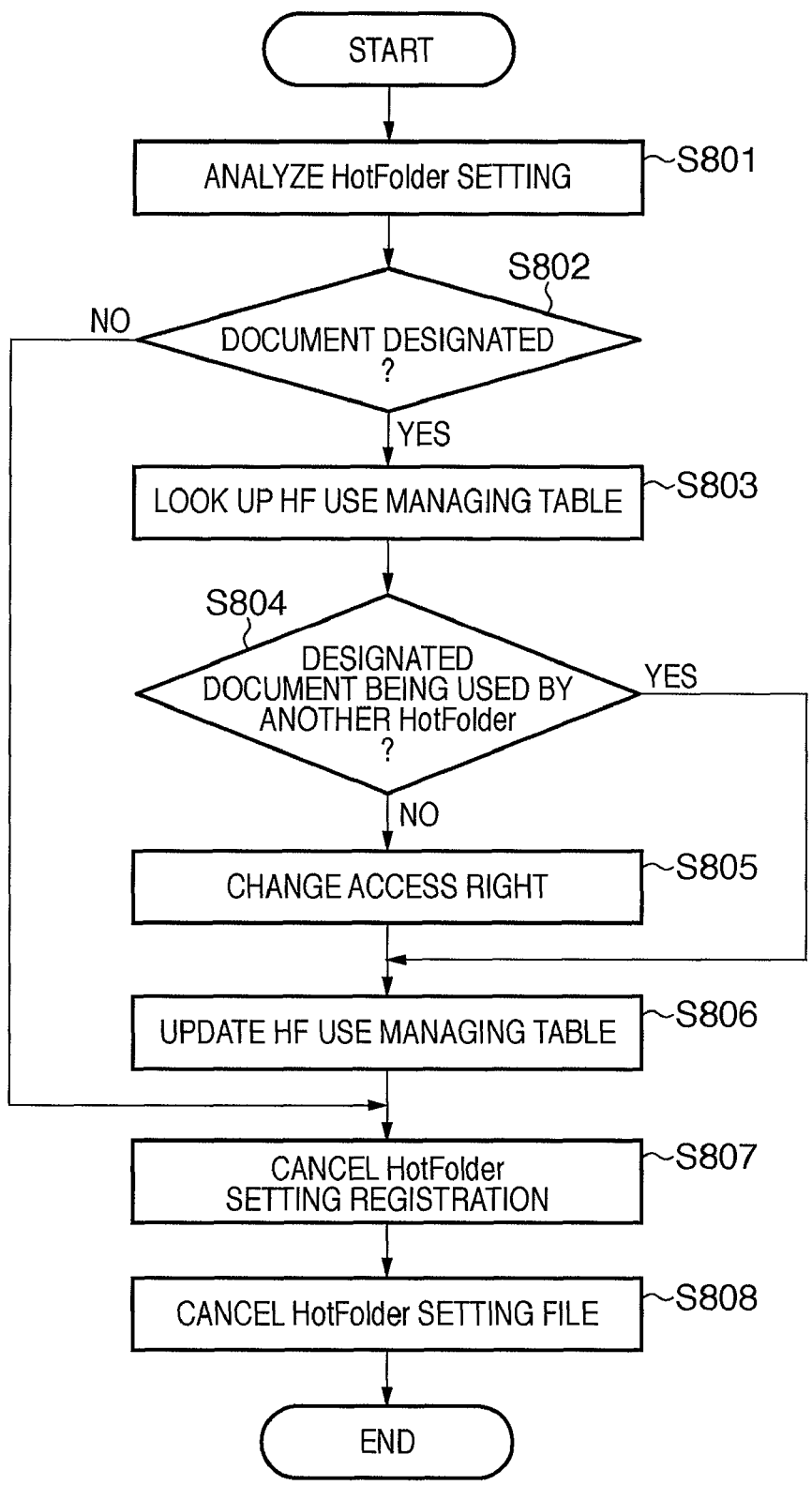
FIG. 8 is a flowchart for explaining a hot-folder setting cancel process according to the embodiment of the present invention.

FIG. 8 is a flowchart for explaining the hot-folder setting cancel process.

In step S801, the hot-folder setting/execution instructing unit 501 receives a hot-folder setting cancel request and analyzes a hot-folder setting file. In step S802, the hot-folder-setting/execution instructing unit 501 determines whether setting has been done to use a document stored in another folder.

If it is determined in step S802 that use of a document stored in another folder is not set (NO in S802), the process advances to step S807.

On the other hand, if it is determined in step S802 that use of a document stored in another folder is set (YES in S802), the hot-folder setting/execution instructing unit 501 looks up the hot-folder use table 504 (S803).

In step S804, the hot-folder setting/execution instructing unit 501 determines whether the designated document is also being used in another hot folder. If the document is also being used in the other hot folder (YES in S804), the process advances to step S806. On the other hand, if the document is not being used in any other hot folder (NO in S804), the hot-folder setting/execution instructing unit 501 changes the access right of the designated document (S805).

The access right is changed by, for example, canceling an access restriction such as "any user can delete". This access right change is merely an example. Any other access right change can be done if a document designated by a hot-folder setting becomes usable as a general document upon canceling the hot-folder setting, as a matter of course.

In step S806, the hot-folder setting/execution instructing unit 501 cancels the association between the hot-folder setting (hot-folder setting file) and the document of use in the hot-folder use table 504. The hot-folder use table 504 is updated by canceling the association.

In step S807, the hot-folder setting/execution instructing unit 501 changes folder type information managed by box management information in the document managing unit 305 from "hot folder" to "normal folder".

In step S808, the hot-folder setting/execution instructing unit 501 deletes the saved hot-folder setting file and finishes the process.

In this embodiment, the client computer 120 cancels a hot-folder setting. However, a hot-folder setting may be canceled on the operation unit 134 of the digital multi-functional peripheral 130, as a matter of course.

(Example of Setting/Cancel of Hot Folder)

Figure 9A:
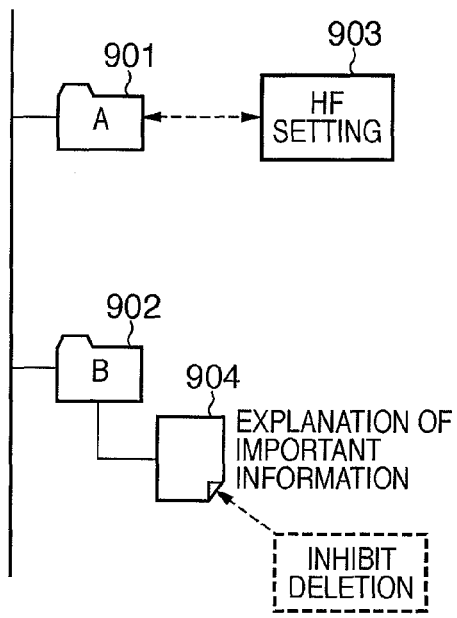
FIG. 9A is a view for explaining setting of a hot folder.

Detailed examples of setting and cancel of a hot folder in the above process will be described next with reference to FIGS. 9A and 9B. FIG. 9A is a view for explaining setting of a hot folder. A folder A 901 is set as a hot folder by a hot-folder setting process. A hot-folder setting file 903 is transmitted from the client computer 120 and saved as a hidden file. The hot folder is set to execute an operation of "merging a document with another document and printing the document" when an event "document has been submitted (stored in folder)" has occurred.

An example of the description of a hot-folder-setting file will be described with reference to FIG. 10.

The hot-folder-setting file includes, as constituent elements, FOLDER 1001 indicating the path of the folder for which a hot folder is set, and EVENT 1002 describing an event that triggers execution of an operation. The hot-folder-setting file also includes, as constituent elements, OPERATION 1003 describing an operation to be executed, and setting information 1004 in the operation to be executed.

The hot-folder setting file 903 describes "A" for FOLDER, "document submission" for EVENT, "merge printing" of "B/explanation of important information" for OPERATION. In accordance with this description, an access right to inhibit deletion is set for a document "explanation of important information" stored in a folder B 902.

When the user stores a document in the folder A 901, a "document submission" event occurs. In the hot-folder setting file 903, an operation "merge printing" of "B/explanation of important information" is set in correspondence with the "document submission" event. Hence, an explanation of important information 904 in the folder B 902 is merged with the submitted document file and printed.

Figure 10:
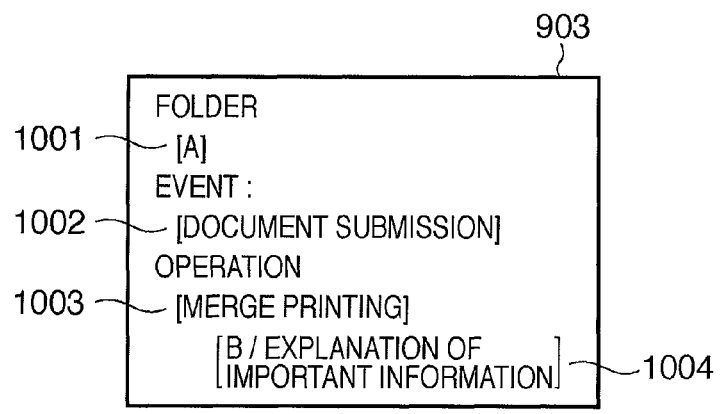
FIG. 10 is view for explaining an example of the description of a hot-folder setting file according to the embodiment of the present invention.

FIG. 10 shows a mere example of the hot-folder setting description, and the present invention is not limited to this. For example, XML or any other description method is usable.

Figure 9B:
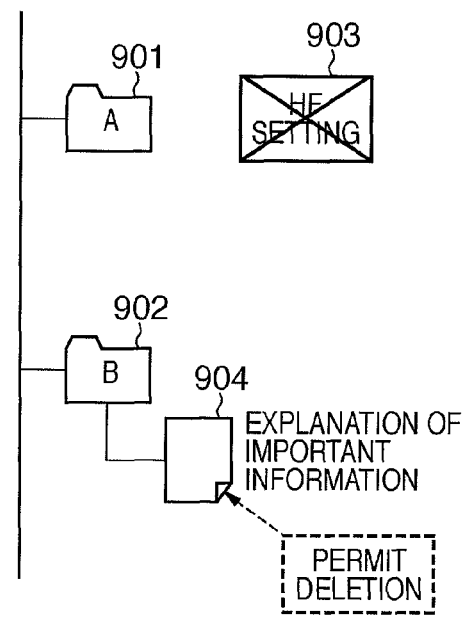
FIG. 9B is a view for explaining cancel of a hot folder.

FIG. 9B is a view for explaining cancel of a hot folder. The hot-folder setting of the folder A 901 is canceled, and the hot-folder-setting file 903 is also deleted by the hot-folder cancel process. This allows the folder A 901 to, for example, store a document as a normal folder. At this time, the document "explanation of important information" stored in the folder B 902 changes to a document not to be used in the hot-folder setting. Hence, the access right changes to enable deletion of it.

The above-described detailed example is applicable to a case of use in, for example, the life insurance industry in which an insurance agent who has created a specification always attaches an explanation of important information to it and then gives it to the customer. The specification creator can automatically attach the explanation of important information and print it only by scanning the created specification and storing it in the hot folder. Additionally, when permanent information such as an explanation of important information whose contents never change is securely saved without allowing deletion or editing, unauthentic printing can be prevented.

(Document Access Right Change Process)

The process of changing the access right of a document stored in another folder to be used in a hot folder has been described above. It is sometimes impossible to change the access right because, for example, another process is using the document.

Figure 11:
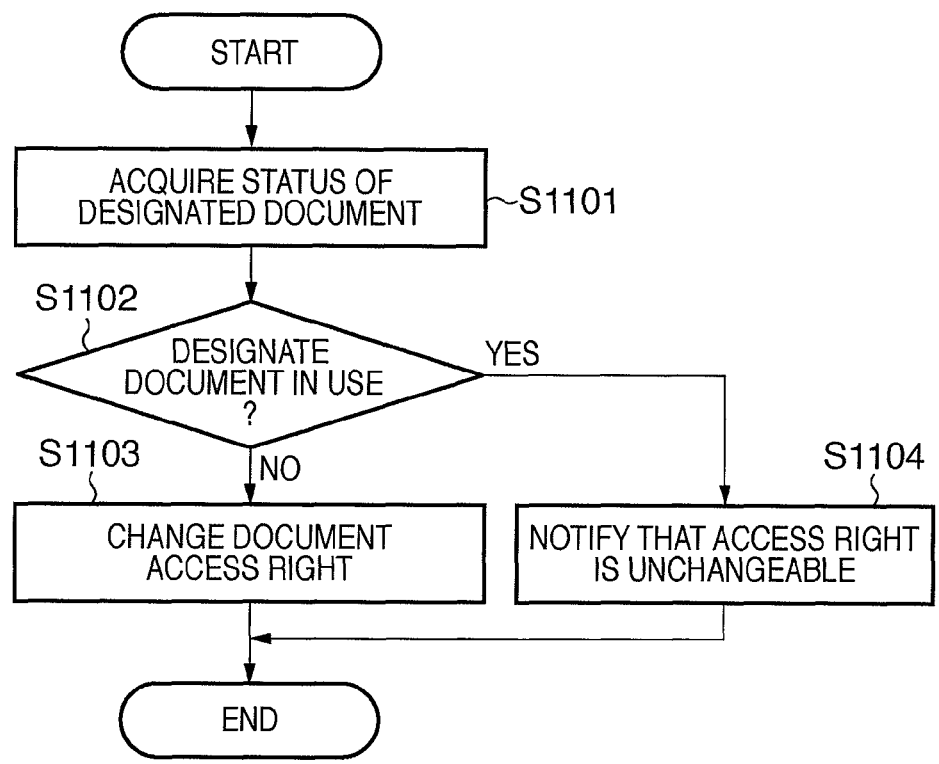
FIG. 11 is a flowchart for explaining a document-access-right change processing method.

FIG. 11 is a flowchart for explaining a document access right change processing method. This flowchart shows details of the access right change process in the hot-folder setting process, which is executed after acquisition and analysis of a hot-folder setting file in FIG. 7.

In step S1101, the hot-folder setting/execution instructing unit 501 acquires the status of a designated document. In step S1102, the hot-folder setting/execution instructing unit 501 determines whether the designated document is being used.

The hot-folder setting/execution instructing unit 501 functioning as an access right setting unit can determine, by referring to a print job list representing the status of a print process, whether document data stored in another folder is being used.

If the designated document is not being used, that is, the setting of the document access right is changeable (NO in S1102), the document access right setting is changed to inhibit deletion (S1103). When the document data is not being used, the hot-folder setting/execution instructing unit 501 functioning as an access right setting unit sets an access right for the document data so that the data becomes accessible by the hot folder.

The above-described access right setting change is merely an example. Any other access right setting change can be done if a process can be executed in accordance with a hot-folder setting without changing a document designated by it, as a matter of course.

On the other hand, if the designated document is being used, that is, the setting of the document access right is unchangeable (YES in S1102), the hot-folder setting/execution instructing unit 501 notifies the UI unit 300 that the access right setting is unchangeable (S1104) without changing the access right setting, and finishes the process.

According to this embodiment, it is possible to implement a hot folder by associating a normal box with a setting file without creating a dedicated hot folder on a program.

Even when use of a document in another folder is designated by a hot-folder setting, it is possible to automatically set an access right for the document. This prevents any operation error of the hot folder.

Second Embodiment

A process will be described in this embodiment, in which a document stored in another folder to be used in a hot folder is copied and used when it is impossible to set or change the access right of the document because, for example, it is being used by another process. The series of hot-folder setting processes is the same as that of the first embodiment shown in FIGS. 1 to 10 described above, and a description thereof will not be repeated.

Figure 12:
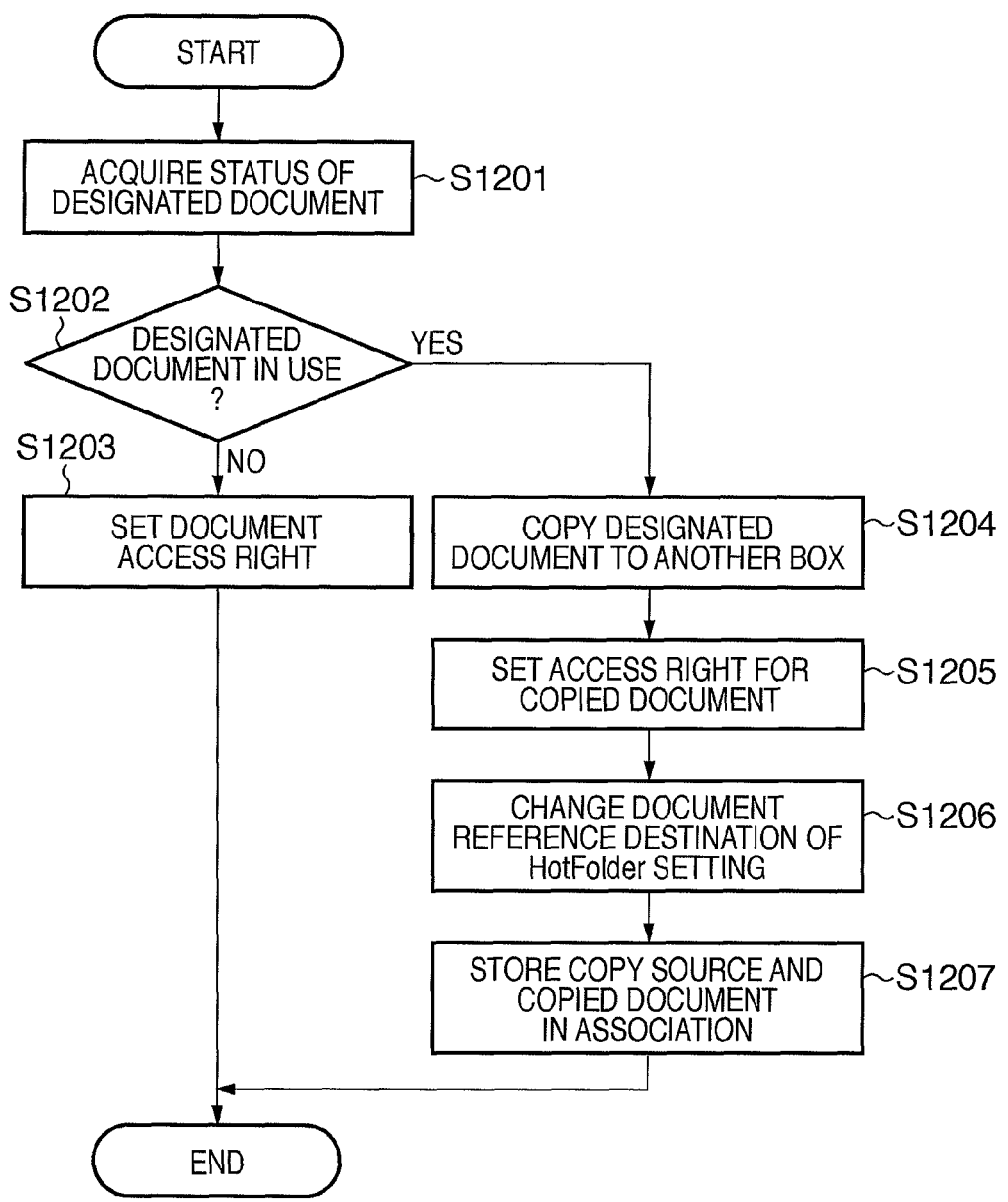
FIG. 12 is a flowchart for explaining a document-access-right-change processing method according to the second embodiment.

FIG. 12 is a flowchart for explaining a document access right change processing method according to the second embodiment. This flowchart shows details of an access right change process in a hot-folder setting process, which is executed after acquisition and analysis of a hot-folder setting file.

In step S1201, a hot-folder setting/execution instructing unit 501 acquires the status information of a designated document. In step S1202, the hot-folder setting/execution instructing unit 501 determines whether the status of the designated document is "in use".

That the document status is "in use" indicates that a process such as printing or editing is being executed, and changing the access right causes inconsistency. To acquire the status information, the hot-folder setting/execution instructing unit 501 periodically acquires a list of print jobs whose printing is progressing, and determines whether the list includes the designated document. It is also possible to determine whether the document status is "in use" by acquiring a change in the status of the designated document based on an event. The document status information acquisition methods are merely examples. Any other acquisition method is applicable if it allows determining the document status. If the document is not being used (NO in S1202), the hot-folder setting/execution instructing unit 501 sets the document access right to inhibit deletion (S1203), and finishes the process. The above-described access right setting is merely an example. Any other access right setting can be done if a process can be executed in accordance with a hot-folder setting without changing a document designated by it, as a matter of course.

On the other hand, if it is determined in step S1202 that the document is being used (YES in S1202), the designated document is copied to another folder (Box) (S1204). The hot-folder setting/execution instructing unit 501 sets the access right of the copied document to inhibit deletion (S1205). In this case, the hot-folder setting/execution instructing unit 501 can function as a generation unit which generates a copy of data if the data is being used. The hot-folder setting/execution instructing unit 501 functioning as an access right setting unit sets an access right for the data generated as the reference target of the hot folder. In the process in step S1204, a hot-folder use table 504 stores identification information (copy document ID) to specify the copied data.

In step S1206, the hot-folder setting/execution instructing unit 501 changes the operation description in the hot-folder setting file to use the copied document.

In step S1207, the hot-folder setting/execution instructing unit 501 associates the copy source document with the copied document by storing the document ID of the copied document in the hot-folder use table 504, and finishes the process.

If the status of the initially designated document is not indicating "in use" anymore, the designated document is changed to use the document.

Figure 13:
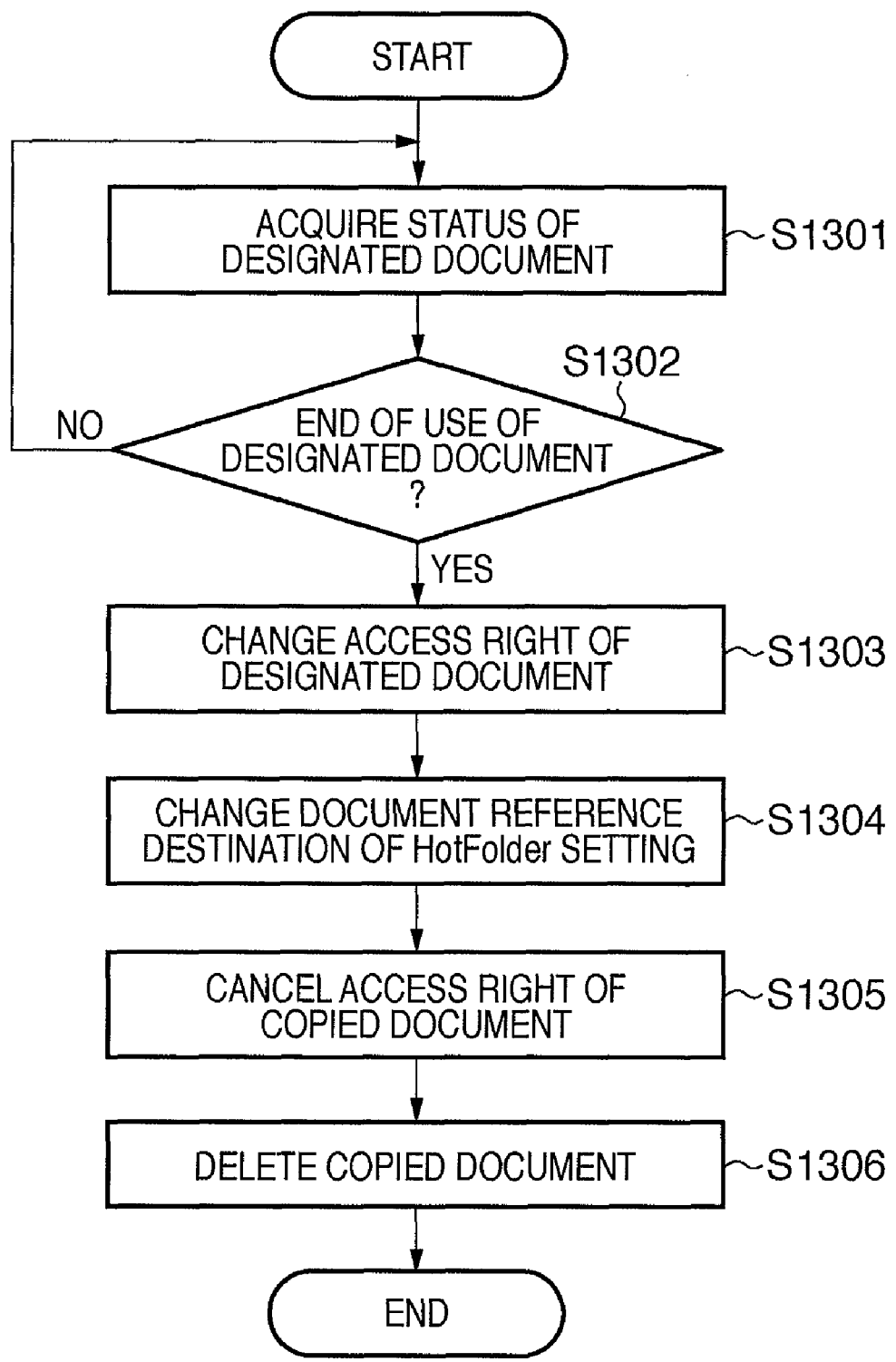
FIG. 13 is a flowchart for explaining a document-use change processing method according to the second embodiment.

FIG. 13 is a flowchart for explaining a document-use change processing method.

In step S1301, the hot-folder setting/execution instructing unit 501 acquires the status information of the designated document. In step S1302, the hot-folder setting/execution instructing unit 501 determines whether the status of the document is "in use".

If the status of the document is "in use" (NO in S1302), the process returns to step S1301 to wait for the end of use of the designated document.

If it is determined in step S1302 that the status of the designated document is not "in use" (YES in S1302), the hot-folder setting/execution instructing unit 501 changes the access right of the designated document to inhibit deletion (S1303). The above-described access right setting is merely an example. Any other access right setting can be done if a process can be executed in accordance with a hot-folder setting without changing a document designated by it, as a matter of course.

In step S1304, the hot-folder setting/execution instructing unit 501 changes the operation description in the hot-folder setting file to use the copy source document.

In step S1305, the hot-folder setting/execution instructing unit 501 cancels the access right of the copied document.

In step S1306, the hot-folder setting/execution instructing unit 501 deletes the copied document data and the document ID of the copied document stored in the hot-folder use table 504, and finishes the process.

According to this embodiment, even when a hot-folder setting designates use of a document in another folder, it is possible to automatically change the access right of the document. This prevents any operation error of the hot folder.

Third Embodiment

A process will be described in this embodiment, in which when it is impossible to set or change the access right of a document stored in another folder to be used in a hot folder because, for example, it is being used by another process, the access right is changed after the end of use in a certain use situation. The series of hot-folder setting processes is the same as that of the first embodiment shown in FIGS. 1 to 10 described above, and a description thereof will not be repeated.

Figure 14:
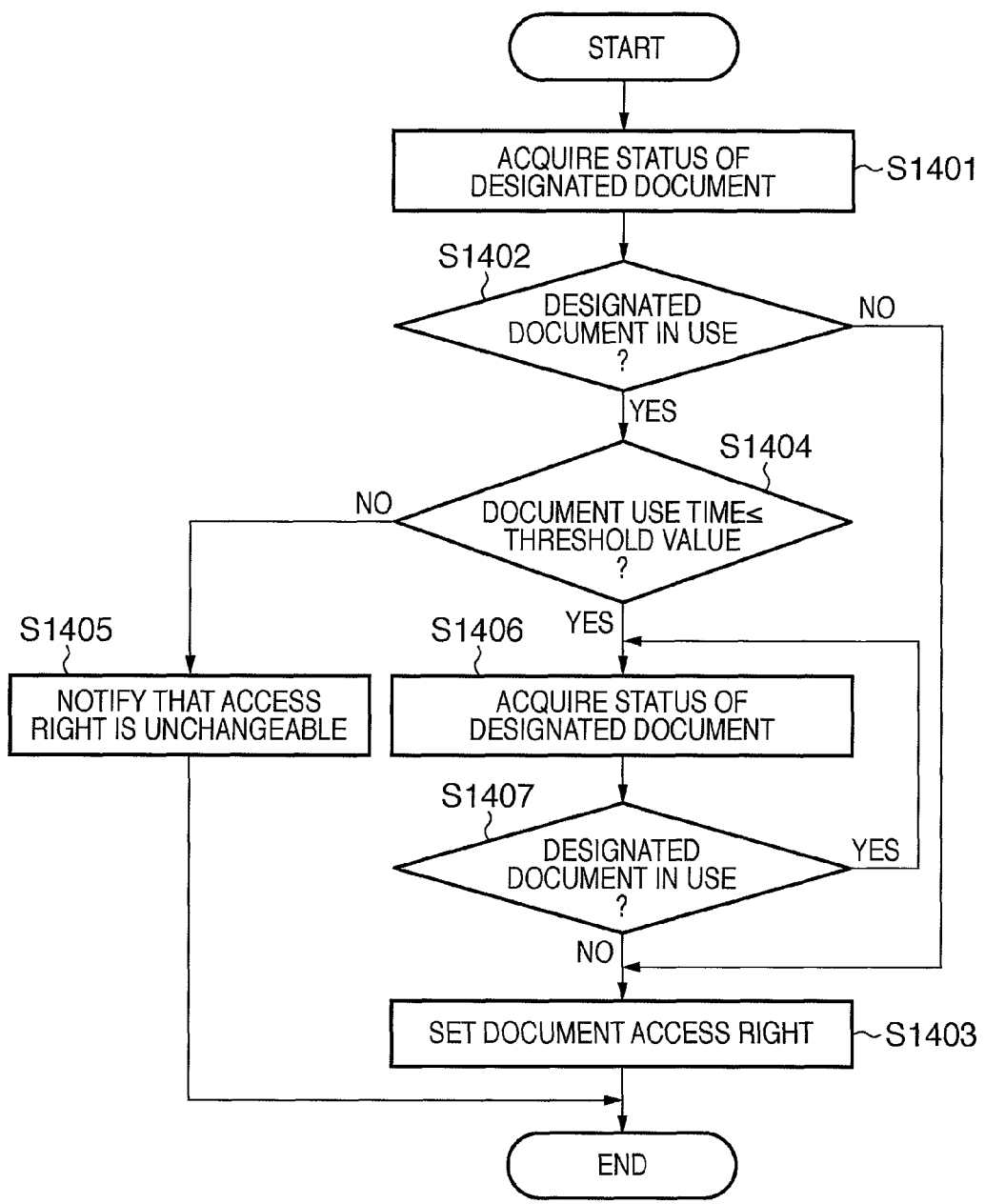
FIG. 14 is a flowchart for explaining a document-access-right change processing method according to the third embodiment.

FIG. 14 is a flowchart for explaining a document access right change processing method according to the third embodiment. This flowchart shows details of an access right change process in a hot-folder setting process, which is executed after acquisition and analysis of a hot-folder setting file.

In step S1401, a hot-folder setting/execution instructing unit 501 acquires the status information of a designated document. In step S1402, the hot-folder setting/execution instructing unit 501 determines whether the status of the designated document is "in use".

That the document status is "in use" indicates that a process such as printing or editing is being executed, and changing the access right causes inconsistency. To acquire the status information, the hot-folder setting/execution instructing unit 501 periodically acquires a list of print jobs whose printing is progressing, and determines whether the list includes the designated document. It is also possible to determine whether the document status is "in use" by acquiring a change in the status of the designated document based on an event. The document status information acquisition methods are merely examples. Any other acquisition method is applicable if it allows determining the document status. If the document is not being used (NO in S1402), the hot-folder setting/execution instructing unit 501 sets the document access right to inhibit deletion (S1403), and finishes the process.

On the other hand, if the document is being used (YES in S1402), the hot-folder setting/execution instructing unit 501 calculates the remaining time of use of the document and compares the remaining use time of the document with a preset threshold value (reference time) (S1404).

The hot-folder setting/execution instructing unit 501 can calculate the remaining use time based on, for example, the number of printed pages in a print process. If the time is not measurable, a value equal to or larger than the threshold value (reference time) representing that the time is not measurable is set. If the remaining use time of the document exceeds the threshold value (reference time), the hot-folder setting/execution instructing unit 501 notifies a UI unit 300 that the access right is unchangeable (S1405), and finishes the process.

If the remaining use time of the document is equal to or shorter than the reference time (YES in S1404), the hot-folder setting/execution instructing unit 501 acquires the status information representing the process state of the designated document again (S1406) and determines whether the document status is "in use" (S1407). If the status of the designated document is "in use" (YES in S1407), the process returns to step S1406 to wait for the end of use of the designated document.

On the other hand, if the status of the designated document is not "in use" (YES in S1407), the hot-folder setting/execution instructing unit 501 changes the access right of the designated document to inhibit deletion (S1403), and finishes the process. The above-described access right change is merely an example. Any other access right setting can be done if a process can be executed in accordance with a hot-folder setting without changing a document designated by it, as a matter of course.

According to this embodiment, even when the access right of a document to be used cannot be changed, it is possible to accurately reflect setting information on the hot folder by changing the timing of access right setting based on the setting information. This prevents any operation error of the hot folder.

Other Embodiments

The object of the present invention can also be achieved by supplying a computer-readable storage medium which records software program codes for implementing the functions of the above-described embodiments to a system or apparatus. The object can also be achieved by causing the computer (or CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

Examples of the storage medium to supply the program codes are a flexible disk, hard disk, optical disk, magnetooptical disk, CD-ROM, CD-R, nonvolatile memory card, and ROM.

Additionally, the functions of the above-described embodiments are implemented when the computer executes the read-out program codes. The present invention also incorporates a case in which the OS (Operating System) running on the computer partially or wholly executes actual processing based on the instructions of the program codes, thereby implementing the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-194792, filed Jul. 26, 2007, which is hereby incorporated by reference herein in its entirety.

What is claimed is:

1. An image-forming apparatus configured to execute a process, set in connection with a storage area, on first data, in a case that the first data is submitted to a storage area, comprising:
    a reception unit adapted to receive setting information that designates the storage area and the process to be executed;
    a setting unit adapted to set the process to be executed for the designated storage area on the basis of analysis of the setting information;
    an access right setting unit adapted to, in a case that second data stored in another storage area is designated as data to be used for executing the process on the basis of analysis of the setting information, set an access right to access the second data;
    a managing unit adapted to manage the designated storage area and the second data with the set access right in association with each other; and
    an execution unit adapted to, in a case that the first data is submitted to the designated storage area, execute the process set in the storage area for the submitted first data and the second data that is associated with the storage area and has the set access right, wherein
    in a case that said reception unit has received an instruction to cancel the setting of the designated storage area,
    said access right setting unit determines, by referring to information representing a process status of the second data, whether the second data associated with the designated storage area is being used,
    if the second data is not being used, said access right setting unit cancels the access right for the second data, and
    said managing unit cancels the association between the designated storage area and the second data.

2. The apparatus according to claim 1, wherein said access right setting unit determines, by referring to information representing a process status of the second data, whether the second data stored in said another storage area is being used, and
    if the second data is not being used, said access right setting unit said access right setting unit sets the access right to make the second data usable.

3. The apparatus according to claim 2, wherein
    if the second data is being used, said access right setting unit calculates a remaining use time until an end of use of the second data, and
    if the remaining use time is not more than a reference time, said access right setting unit acquires the information representing the process status of the second data again and determines a process state of the second data.

4. The apparatus according to claim 2, wherein if the second data is being used, said access right setting unit generates a copy of the second data and sets an access right for the copied data as a reference destination of the data to be used for executing the process.

5. The apparatus according to claim 4, wherein said managing unit manages the designated storage area and the copied data in association with each other.

6. The apparatus according to claim 5, wherein
    in a case that the process of the second data in use has finished, said access right setting unit changes the setting of the access right so that the reference destination of the data changes to a reference destination designated by the setting information, and
    said managing unit cancels the association between the copied data and the access right for the copied data.

7. The apparatus according to claim 1, wherein in a case that said reception unit has received an instruction to delete the second data stored in said another storage area, said access right setting unit determines on the basis of the access right set for the second data whether deletion is possible, and if possible, deletes the second data.

8. The apparatus according to claim 7, wherein upon determining on the basis of the access right set for the second data that deletion of the second data is not possible, said access right setting unit sends an error notification indicating that deletion is impossible.

9. A method of controlling an image-forming apparatus to execute a process, set in connection with a storage area, on first data, in a case that the first data is submitted to the storage area, the method comprising:
    receiving setting information that designates a storage area and a process to be executed;
    setting the process to be executed for the designated storage area on the basis of analysis of the setting information;
    in a case that second data stored in another storage area is designated as data to be used for executing the process on the basis of analysis of the setting information, setting an access right to access the second data;
    managing the designated storage area and the second data with the set access right in association with each other; and
    in a case that the first data is submitted to the designated storage area, executing the process set in the storage area for the submitted first data and the second data that is associated with the storage area and has the set access right, wherein in a case that an instruction to cancel the setting of the designated storage area is received, it is determined, by referring to information representing a process status of the second data, whether the second data associated with the designated storage area is being used;

if the second data is not being used, the access right for the second data is canceled; and the association between the designated storage area and the second data is canceled.

10. The method according to claim 9, wherein during setting of the access right, it is determined, by referring to information representing a process status of the second data, whether the second data stored in said another storage area is being used, and if the second data is not being used, the access right is set to make the second data usable.

11. The method according to claim 10, wherein during setting of the access right, if the second data is being used, a remaining use time until an end of use of the second data is calculated, and if the remaining use time is not more than a reference time, the information representing the process status of the second data is acquired again, and a process state of the second data is determined.

12. The method according to claim 10, wherein during setting of the access right, if the second data is being used, a copy of the second data is generated, and an access right is set for the copied data as a reference destination of the data to be used for executing the process.

13. The method according to claim 12, wherein the designated storage area and the copied data are managed in association with each other.

14. The method according to claim 13, wherein during setting of the access right, in a case that the process of the second data in use has finished, the setting of the access right is changed so that the reference destination of the data changes to a reference destination designated by the setting information, and the association between the copied data and the access right for the copied data is canceled.

15. The method according to claim 9, wherein in a case that an instruction to delete the second data stored in said another storage area is received, it is determined on the basis of the access right set for the second data whether deletion is possible, and if possible, the second data is deleted.

16. The method according to claim 15, wherein upon determining on the basis of the access right set for the second data that deletion of the second data is not possible, an error notification representing that deletion is impossible is sent.

17. A non-transitory computer-readable storage medium storing a program for causing an image-forming apparatus to perform a method comprising:

receiving setting information that designates a storage area and a process to be executed;

setting the process to be executed for the designated storage area on the basis of analysis of the setting information;

in a case that second data stored in another storage area is designated as data to be used for executing the process on the basis of analysis of the setting information, setting an access right to access the second data;

managing the designated storage area and the second data with the set access right in association with each other; and in a case that the first data is submitted to the designated storage area, executing the process set in the storage area for the submitted first data and the second data that is associated with the storage area and has the set access right, wherein in a case that an instruction to cancel the setting of the designated storage area is received, it is determined, by referring to information representing a process status of the second data, whether the second data associated with the designated storage area is being used;

if the second data is not being used, the access right for the second data is canceled; and the association between the designated storage area and the second data is canceled.

* * * * *